US005521374A

United States Patent [19]
Cray et al.

[11] Patent Number: 5,521,374
[45] Date of Patent: May 28, 1996

[54] FOCUSED LASER BEAM MEASUREMENT SYSTEM AND METHOD OF BEAM LOCATION

[75] Inventors: Gregory D. Cray, Chanhassen; Terry L. VanderWert, Inver Grove Heights, both of Minn.

[73] Assignee: Lumonics Corporation, Eden Prairie, Minn.

[21] Appl. No.: 302,070

[22] Filed: Sep. 7, 1994

[51] Int. Cl.$^6$ .................................................. H01J 3/14
[52] U.S. Cl. ................. 250/216; 250/201.2; 219/121.83; 356/123
[58] Field of Search ............................... 250/216, 201.2, 250/201.3, 559.13, 559.4, 559.49, 306, 307; 356/121, 123; 219/121.83, 121.85, 121.75, 121.78–121.81

[56] References Cited

U.S. PATENT DOCUMENTS

| | | | |
|---|---|---|---|
| 4,945,206 | 7/1990 | Arai | 219/121.78 |
| 5,231,264 | 7/1993 | Fujita | 219/121.79 |
| 5,340,962 | 8/1994 | Schmidt et al. | 219/121.78 |

OTHER PUBLICATIONS

Beam Characterization and Measurement of Propagation Attributes Sasnett et al. SPIE vol. 1414 Laser Beam Diagnostics, pp. 21–32, Jan. 1991.
Laser Power Focal Point, vol. 2, No. 1, p. 1, Mar. 1994.

Primary Examiner—Edward P. Westin
Attorney, Agent, or Firm—James W. Miller

[57] ABSTRACT

A laser beam measurement device comprises a pinhole aperture spaced to one side of a power meter for measuring the power level of the laser beam. The positioning system of the laser system causes the laser beam to move relative to the pinhole aperture in each of the three x, y and z directions of an xyz coordinate system, namely longitudinally, transversely and radially relative to the pinhole aperture, respectively. During each scan, the power meter measures the Gaussian distribution of the power level that occurs when the laser beam passes through the pinhole aperture and moves relative thereto along the scan axis. The coordinate position of the laser beam along each scan axis is identified corresponding to a peak value of the Gaussian distribution, thus deriving a three dimensional reference location corresponding to the point in space at which the focal point of the laser beam is centered on the pinhole aperture.

23 Claims, 3 Drawing Sheets

FOCUSED LASER BEAM MEASUREMENT SYSTEM AND METHOD OF BEAM LOCATION

TECHNICAL FIELD

This invention relates to a method for determining the location of a focused laser beam in three dimensional space, and to a beam measurement system and device for use in this method.

BACKGROUND OF THE INVENTION

Most machine tools that use laser beams utilize a positioning system having mechanical and optical elements to position the beam relative to the workpiece. While it is a simple matter to measure the position of these mechanical and optical elements, it has been difficult to measure the position of the focused beam directly. Since it is the position of the focused beam that affects the workpiece, it is the position of the focused beam, and not the position of the mechanical and optical elements, that is most important when determining the accuracy of the machine tool.

State of the art laser machine tools position the laser beam relative to the workpiece using motor drive systems and digital computer control. The laser beam is normally aligned to the mechanical and optical elements so that it is positioned in a nominally fixed position relative thereto. Practically, the alignment of the focused beam relative to the mechanical and optical elements is imperfect, and some shift in the relative position of the focused beam and the mechanical/optical elements occurs over time.

Since the focused beam does not stay in a fixed position relative to the mechanical and optical elements of the beam positioning system, it becomes beneficial to have the capability to determine the location of the focused beam directly in a three dimensional coordinate system. In this way, any shift of the relative position of the focused beam can be detected and measured. This information can then be used to determine the position error, and a determination can be made if the error falls within the allowed tolerance band for the particular operation being performed by the machine tool. If the position error is too large, the information can be used to alert the operator that the beam should be recalibrated or realigned relative to the mechanical/optical elements before conducting further operations with the machine tool.

Without some means to measure the focused position of the beam, its position can only be approximately located by visually observing the sparks created when it is positioned at the surface of a metal target.

Certain laser machine tools are equipped with cameras which can be used to visually observe the beam position. In these systems, usually limited to YAG lasers, the camera uses the same mechanical and optical elements as the laser so that any change affects the laser and camera equally. While these systems allow the system user to observe the beam position via the camera, they are not easily automated and are limited to lasers that operate at a frequency in or near the visible spectrum. Also, the position of the focused beam in the radial direction (i.e. along the z axis in an xyz coordinate scheme) cannot be determined accurately using such visual systems.

SUMMARY OF THE INVENTION

One aspect of this invention is a method of determining the location of a focal point of a focused laser beam along an axis of motion of the beam. The method comprises providing a means for measuring a measurable property of the laser beam which measuring means is so constructed and arranged relative to the laser beam such that the measurable property of the beam at the measuring means will exhibit a Gaussian distribution as the focal point of the laser beam moves relative to the measuring means along the axis of motion thereof. A positioning means is also provided for moving the focal point of the laser beam along the axis of motion thereof and for supplying different coordinate positions corresponding to different physical positions of the focal point of the laser beam along the axis of motion. The method further comprises moving the focal point of the laser beam in a first direction along the axis of motion thereof relative to the measuring means to produce a first Gaussian distribution of the measurable property at the measuring means, measuring the first Gaussian distribution of the measurable property at the measuring means as a function of the coordinate positions of the focal point of the laser beam along the axis of motion, and identifying a first particular coordinate position of the focal point of the laser beam along the axis of motion that corresponds to a peak value of the first Gaussian distribution.

Another aspect of this invention relates to a particular beam measurement device used in the method of this invention. This device comprises a pinhole aperture through which the laser beam is arranged to pass with such laser beam diverging after passing through the pinhole aperture, and a means for measuring the measurable property of the laser beam spaced to one side of the pinhole aperture oppositely to a side of the aperture through which the laser beam passes, whereby the measuring means will measure the measurable property of the laser beam as it impacts the measuring means after the laser beam passes through the pinhole aperture and begins to diverge.

BRIEF DESCRIPTION OF THE DRAWINGS

The present invention will be described hereafter in the Detailed Description, taken in conjunction with the following drawings, in which like reference numerals refer to like elements or parts throughout.

DETAILED DESCRIPTION

Figure 1:
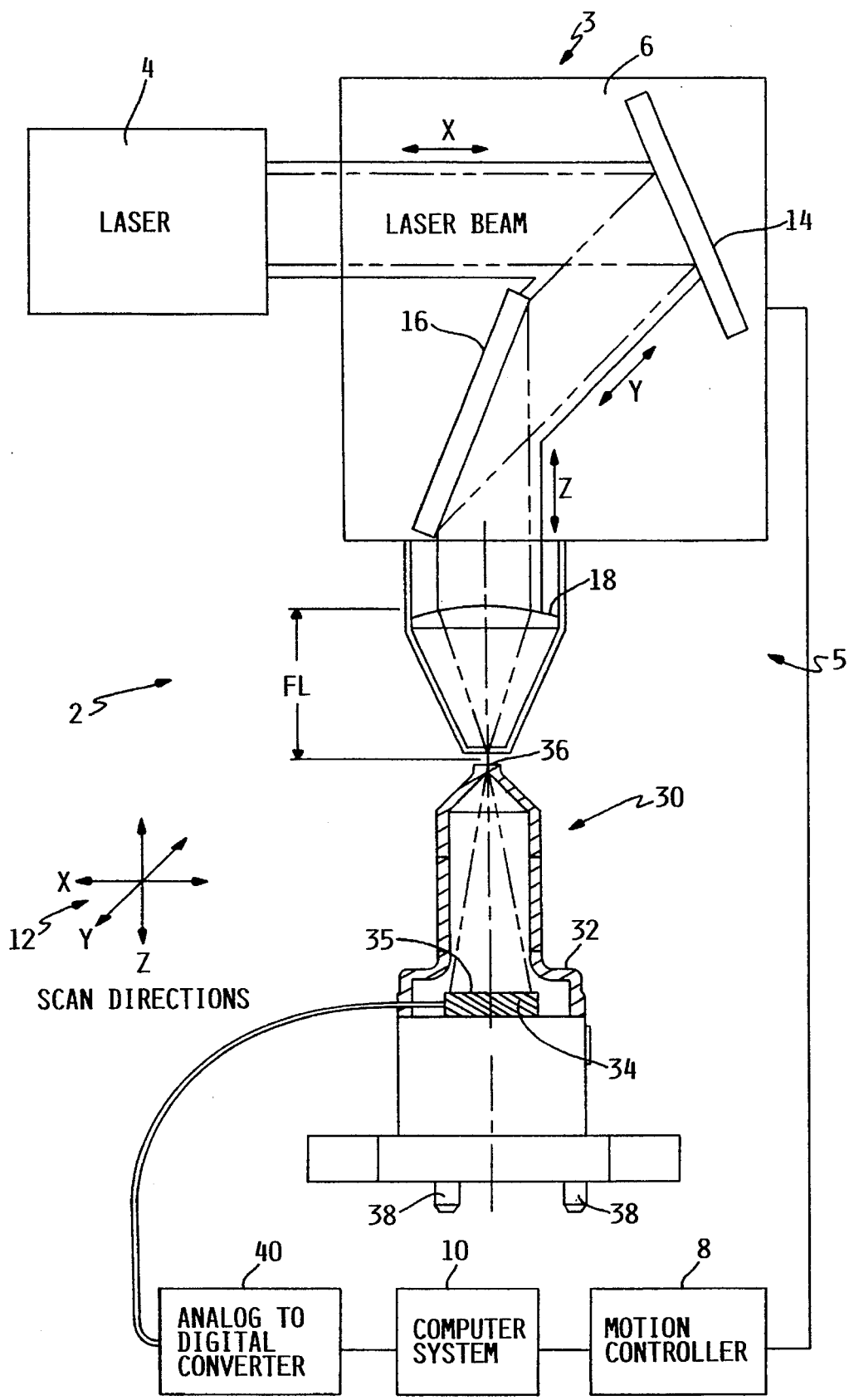
FIG. 1 is a diagrammatic view of a focused laser beam measurement system according to this invention, particularly illustrating a beam measurement device including a pinhole aperture, with the beam measurement device being shown in a side elevational form, partially in cross-section, and with the measurement system serving to determine the location in the three dimensions of an xyz coordinate system of the focal point of the laser beam when such focal point is centered on the aperture.

Referring first to FIG. 1, a focused laser beam measurement system according to this invention is generally identified as 2. Measurement system 2 includes a typical laser machine tool, generally indicated at 3, including a laser generator 4 and a positioning means, generally indicated at 5, for directing the laser beam generated by generator 4. Positioning means 5 comprises a positioning system 6 for moving the focal point of the laser beam in three dimensional space along the orthogonal x, y, and z axes of an xyz coordinate system, a motion controller 8 interconnected with positioning system 6 for moving the focal point of the laser beam in a precisely controlled manner, and a logic and control means comprising a computer control system 10 for programming and controlling the desired motion of the focal point of the laser beam. The xyz coordinate system is illustrated generally at 12 in FIG. 1.

Computer control system 10 and motion controller 8 both control the operation of positioning system 6 and serve as a source of x, y and z coordinate positions to indicate the position of the focal point within the coordinate system relative to a nominal zero position. Thus, for example, the desired position of the focal point could be supplied by computer control system 10 or motion controller 8 as 10, 8, 2, thus indicating that the focal point is to be located 10 units of measurement from the 0 position along the x axis, 8 units of measurement from the 0 position along the z axis, and −2 units of measurement from the 0 position along the z axis. The focal point of the laser beam will, in fact, be located at these coordinates as long as the laser beam remains properly calibrated relative to the mechanical and optical components of positioning system 6.

While various types of positioning systems 6 could be used, one well known and preferred system includes a first mirror 14 which is movable along the x axis to move or vary the location of the focal point along the x axis. A second mirror 16 is movable relative to first mirror 10 along the y axis to move or vary the location of the focal point along the y axis. A focusing lens 18, having a fixed focal length fl, receives the laser beam after it has passed between the first and second mirrors 14 and 16. The focusing lens 18 is movable along the z axis to move or vary the location of the focal point along the z axis.

The depiction of laser machine tool 3 contained in FIG. 1 is diagrammatic only as such a laser machine tool, including its associated laser generator 4, positioning system 6, motion controller 8 and computer control system 10, is well known in the art. Lumonics Corporation of Eden Prairie, Minn., the assignee of this invention, makes various laser machine tools of this type, such as Models 520, 550, 780 and 890. A typical laser machine tool 3 of this type is also depicted in U.S. Pat. No. 4,555,610, which patent is hereby incorporated by reference.

Laser machine tool 3 contained herein comprises a fixed or stationary laser generator 4 with movement of the focal point of the laser beam being accomplished by the mechanical and optical components of the positioning system 6. However, this is not necessary to the present invention. The present invention is equally applicable to a laser machine tool in which the positioning system is used to physically move the laser generator to vary the position of the focal point in the xyz coordinate system. Alternatively, the present invention is also applicable to a system in which the laser generator and its focal point is spatially fixed and the positioning system is instead used to move the worktable in three dimensions relative to the laser generator. For the present invention to be applicable, there must simply be some means for causing the focal point of the laser beam to be moved relative to a worktable along the x, y and z axes of an xyz coordinate system, i.e. along the axes of relative motion of the laser beam.

Figure 2:
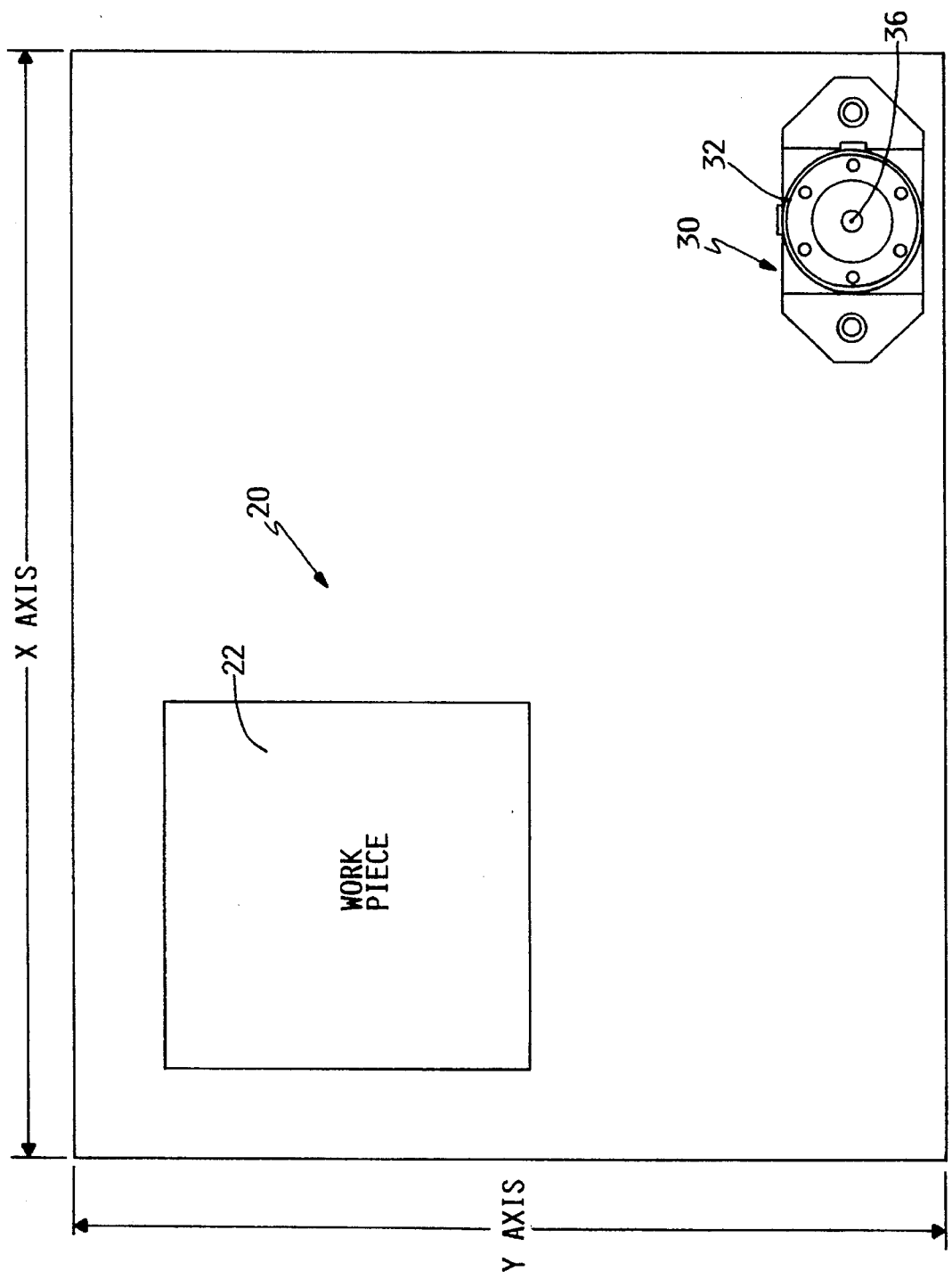
FIG. 2 is a top plan of a worktable with which the focused laser beam measurement system may be used illustrating generally a workpiece on such worktable, and particularly illustrating the beam measurement device shown in FIG. 1 from the top thereof with the beam measurement device having been fixed in place on the worktable.

The purpose of moving the focal point of the laser beam within the three dimensional space of an xyz coordinate system is to allow the laser beam to perform some type of operation. This operation is usually a manufacturing operation on a workpiece, such as cutting or drilling of the workpiece. FIG. 2 diagrammatically illustrates a worktable 20 having a workpiece 22 mounted thereon. Positioning system 6 is controlled by motion controller 8 and computer system 10 to move the laser beam relative to workpiece 22 to allow the focal point of the laser beam to perform a desired operation. For example, if it were desired to simply cut a straight line in the workpiece 22 in a direction parallel to the x axis, the focal point of the laser beam would be positioned at constant y and z coordinate positions and the focal point would then be moved by positioning system 6 along the x axis only with the x coordinate position varying as the focal point traverses or scans along the x axis as mirror 14 moves. Because the focal point of the laser beam can be moved in all three of the x, y and z axes, relatively complicated manufacturing operations are possible using laser machine tool 3.

The measurement system 2 of the present invention includes a novel beam measurement device 30 to accurately determine the location of the focal point of the focused laser within the xyz coordinate system used by laser machine tool 3. Beam measurement device 30 consists of a housing 32 having a laser power meter 34 and a pinhole copper aperture 36 (with a 0.020" opening in this implementation) positioned above the upper surface 35 of power meter 34. Copper or other materials that are highly reflective to laser radiation are used to form aperture 36 to avoid damage by the focused laser beam. Laser power meter 34 can comprise a power meter manufactured by Molectron, Model No. PM 300-0563.

The spacing of pinhole aperture 36 above upper surface 35 of power meter 34 is selected such that when the focused beam passes through aperture 36 it diverges enough so that the energy density of the beam is less than the damage threshold for surface 35, but also so that the area of the beam is substantially equal to or somewhat less than the area of upper surface 35 of power meter 34. See FIG. 1. This spacing will vary depending on the focal length of the laser beam and the beam diameter. Thus, beam measurement devices 30 for different laser systems will generally be the same except that the vertical spacing between aperture 36 and upper surface 35 of power meter 34 may vary.

Beam measurement device 30 also includes a means for fixing or securing housing 32 to worktable 20 such that aperture 36 is located at some fixed point in the xyz coordinate system. This could be done in various ways. However, one such securing means comprises a plurality of positioning pins or pegs 38 extending downwardly from housing 32. These positioning pins or pegs 38 can be received in openings therefor to allow beam measurement device to be carried in a fixed location on worktable 20. FIG. 2 shows beam measurement device 30 fixed to such a worktable 20 out of the way of a workpiece carried thereon. However, beam measurement device is located such that the laser beam can reach and contact the pinhole aperture 36 thereof, i.e. pinhole aperture 36 is located within the band of movement of the laser beam that is permitted by positioning system 6 within the xyz coordinate system.

A shown in FIG. 1, beam measurement device 30 is connected through an analog to digital converter 40 to the logic and control means comprising computer system 10. Beam measurement device 30, along with associated software in computer system 10, will determine the location of the laser beam focal point in the xyz coordinate system by measuring the laser power level as a function of coordinate position along the x, y and z axes as the beam is moved or scanned by positioning system 6 relative to pinhole aperture 36 along each of the x, y and z axes.

One specific method according to the present invention of so determining the focal point location of the laser beam will now be described. For the purposes of this description, the x and y axes will comprise, respectively, those axes which define a plane that is parallel to the plane containing pinhole aperture 36 while the z axis is perpendicular to the plane containing pinhole aperture 36. Thus, for the sake of reference, the x axis can be thought of as defining a longitudinal axis passing through aperture 36, the y axis as a transverse axis passing through aperture 36, and the z axis as a radial axis passing through aperture 36.

The location of the laser beam focal point is determined along the x and y axes of travel by moving or scanning the beam across the surface of pinhole aperture 36 along each of the x and y axes. The beam power level is measured and recorded by computer system 10 as a function of the coordinate position along the scan axis as determined or reported by positioning means 5.

As the laser beam scans across pinhole aperture 36, the highest power level is sensed and recorded when the beam is at the center of pinhole aperture 36. Lesser power levels are sensed whenever the beam is out of the center of aperture 36 and is clipped by the aperture edges. Thus, as the beam approaches aperture 36 and moves across the aperture, the measured power level will gradually build to a peak level when the beam is centered on the aperture and will then gradually drop off. Thus, the sensed power level will exhibit a Gaussian distribution (i.e. a bell shaped curve distribution) as the laser beam scans across pinhole aperture 36 which Gaussian distribution is measured using power meter 34 and is stored, at least temporarily, by computer system 10. Computer system 10 can then identify from the data the particular coordinate position which corresponds to a peak value of this Gaussian distribution, e.g. the peak value of the Gaussian distribution for a first scan along the x axis can be identified as having occurred at the x coordinate position of 10.045. This particular coordinate position, namely an x coordinate position of 10.045, represents a reference coordinate location for when the focal point of laser beam is centered on pinhole aperture 36 along the x axis.

Preferably, the laser beam is moved substantially continuously across pinhole aperture 36 along the x and y axes at some predetermined velocity or rate. Typically, there will be a response time lag in the measurement of the power level because power meter 34 has a response time that introduces a time delay in the signal from power meter 34. Thus, the Gaussian distribution of power level as recorded as a function of coordinate positions will lag behind the true coordinate positions at which the sensed power level was actually applied. Desirably, some way of correcting for this response time lag is used so that the particular coordinate position identified by computer system 10 and stored as a reference coordinate location represents the true reference location at which the peak power was applied, i.e. when the focal point of the laser beam was centered on the pinhole aperture.

A simple and effective way of correcting for measurement response time lag is to conduct two scans across the pinhole aperture in both forward and reverse directions of travel and at the same velocity of travel while measuring and storing power level data during each scan. The identified location of the peak power when scanning in the forward direction can then be averaged with the identified peak power location when scanning in the reverse direction to determine the true peak power location. Thus, if the coordinate position identified from the first Gaussian distribution obtained in the forward scan was 10.045, and the coordinate position identified from the second Gaussian distribution obtained in the reverse scan was 10.037, the average of the two, namely 10.041, would represent the true coordinate position of the peak power location, i.e. the coordinate position along the scan axis at which the focal point of the laser beam was centered on aperture 36. By averaging the peak power positions when scanning in two opposed directions along the same axis of motion, the effect of the response time lag is averaged out of the final position as long as the scan velocity is the same when scanning in both directions.

Figure 3:
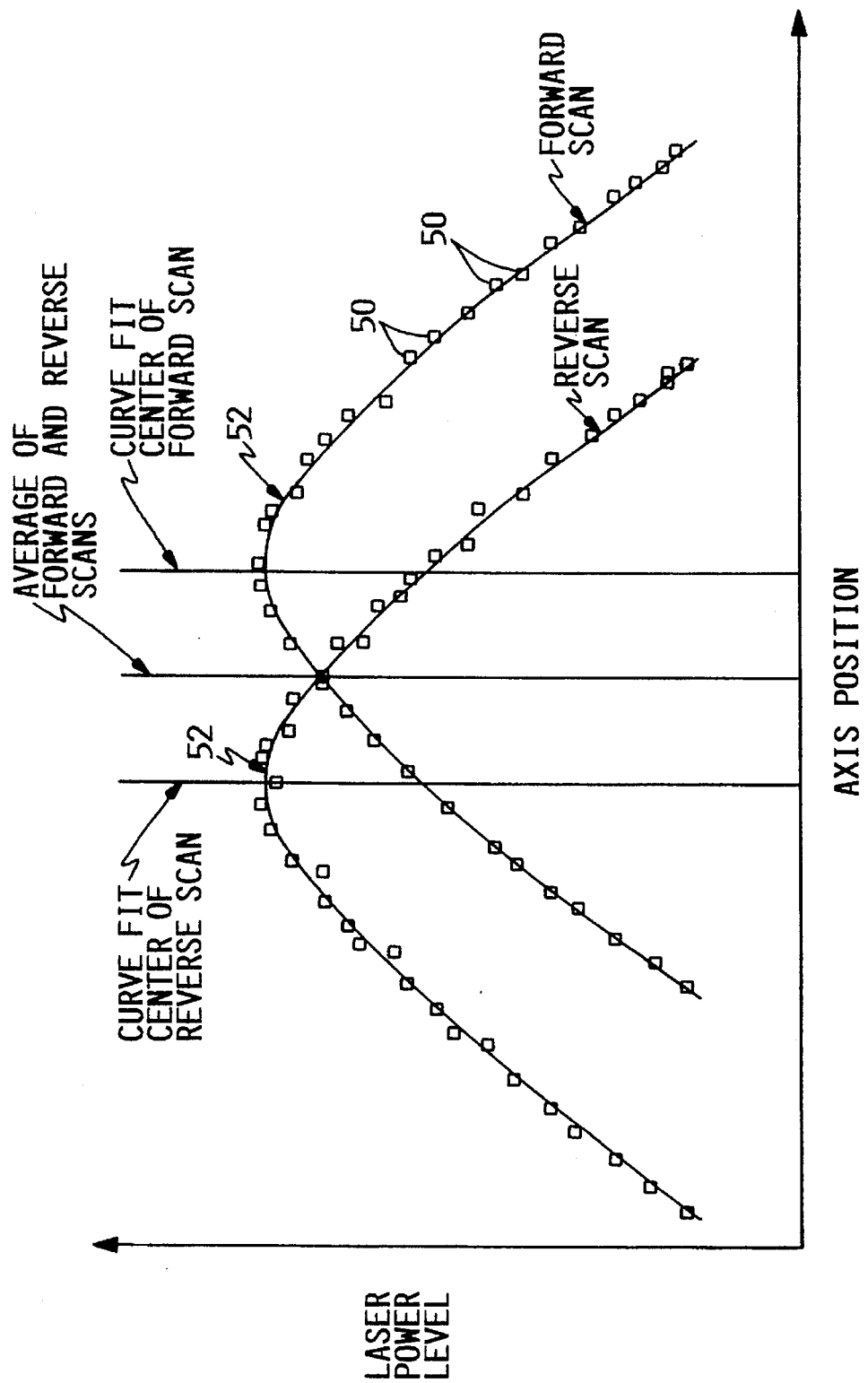
FIG. 3 is graph of typical scan data derived by using the beam measurement system of this invention in a method according to this invention, the graph illustrating the first and second Gaussian distributions of data which is measured and recorded when the laser beam moves relative to the pinhole aperture shown in FIG. 1 along a single axis of motion in two opposed directions of travel.

FIG. 3 is a representation of typical scan data as measured and recorded by the computer system 10 for motion of the laser beam as described above in two directions along one axis. Preferably, computer system 10 does not continuously measure power level data, but does so at periodic intervals (e.g. every 5 milliseconds) during motion of the laser beam in the forward or reverse directions to obtain a plurality of discrete data points, represented by the boxes 50 in FIG. 3. Computer system 10 then fits a curve 52 to each distribution of data points to be able to better identify the peak value of the distribution of data points 50. Because the laser beam passes along the scan axis in both positive and negative directions, a distribution of data points 50, and the curve 52 fitted thereto, will be derived for each direction, thus providing a first Gaussian distribution and a second Gaussian distribution which is shifted relative to the first. The computer system 10 identifies the peak power locations in each Gaussian distribution and averages such locations to identify the particular coordinate position which corresponds to the average. This particular coordinate position is then stored as a reference location corresponding to when the laser beam focal point was centered on pinhole aperture 36 along the axis for which the scans were performed.

Obviously, with respect to determining location of the focal point of the laser beam along the x and y axes, movement of the beam first occurs individually along one axis in the manner described above to identify a reference location for that axis, and then the process is repeated for the other axis, e.g. the x axis location may be determined first and then the y axis location may be determined. The results of the measurements along the first axis may be used to pre-position the beam before conducting the scan along the next axis, e.g. the beam is positioned to the reference location of 10.041 as determined from the example above for the x axis before proceeding with the y axis scan. This will increase the accuracy of the scans along the second and subsequent axes.

To determine the focal point in the radial or z direction (i.e. in the direction normal to the surface of pinhole aperture 36), a similar process of scanning is used except that the focal point of the beam now moves towards and away from the pinhole aperture 36 rather than across the pinhole aperture. With the beam pre-positioned in the center of aperture (as determined by the previous x and y scans), positioning system 6 moves the focusing lens towards aperture 36 and then away therefrom to form the positive and negative directions of travel, respectively. As the focused beam is moved in or out, the beam is clipped by aperture 36 except for when the focused beam is located directly in the center of aperture 36. Thus, peak power is achieved only at the location where the focal point is at the surface of pinhole aperture 36 allowing the beam to pass through aperture 36 at the waist (i.e. the smallest point) of the laser beam. Once again, the average of the two scans cancels the response time effects and provides the reference location of the focal point in the radial or z direction.

Thus, by performing the above-noted operations along each of the x, y and z axes of an xyz coordinate system, a first particular x coordinate position, a first particular y coordinate position, and a first particular z coordinate position will have been identified comprising a three-dimensional reference location corresponding to the location of the focal point of the laser beam when the focal point is centered on the pinhole aperture.

One method of using this information is to check beam alignment over time. If beam measurement device 30 is positioned at the same spot on worktable 20, i.e. aperture 36 is at the same point in the xyz coordinate system, various iterations of the beam measurement method described above can be run to check whether or not beam alignment relative to the mechanical and optical elements of positioning system 6 has changed. For example, a first iteration can be run to derive a reference location value comprising three separate x, y and z coordinates, e.g. 10.041, 8.003, 2.617. Then, as manufacturing operations are performed using laser machine tool 3, it would be possible to perform subsequent iterations of the beam location method in between operations on individual workpieces, or periodically after performing operations on particular numbers of workpieces (e.g. after every 10 or 50 workpieces), and compare the results obtained in subsequent iterations with the three dimensional reference location derived from the first iteration.

If the location as determined in a subsequent iteration is now different in any respect to the reference location, then the user of laser machine tool 3 is alerted to that fact and can determine along which axis the beam misalignment has occurred and what the magnitude of the misalignment is. For example, if a subsequent iterations identifies a location of 10.041, 7.997, and 2.617, then the user knows that the beam alignment along the y axis has shifted by 0.006 (8.003–7, 997) units of measurement. If this shift is still within the tolerance band for the operation then being conducted by laser machine tool 3, then the user can simply continue to operate the laser machine tool 3 without realigning the beam. However, if the shift exceeds some acceptable tolerance band, the user knows this fact and can then recalibrate the laser beam to realign it with the mechanical and optical elements of positioning system 6.

Various modifications will be apparent to those skilled in the art. For example, while the preferred use of the present invention is for a laser beam whose focal point can be moved along each x, y and z axis of a three dimensional coordinate system, it could also be used where the focal point is movable along only one or two axes. Moreover, while the power level of the laser beam comprises that property of the laser beam measured by the measurement device, any property which exhibits a Gaussian distribution could be measured instead of the power level. Thus, this invention is to be limited only by the scope of the appended claims.

We claim:

1. A method of determining the location of a focal point of a focused laser beam along an axis of relative motion of the beam, which comprises:

(a) providing a means for measuring a measurable property of the laser beam which measuring means is so constructed and arranged relative to the laser beam such that the measurable property of the beam at the measuring means will exhibit a Gaussian distribution as the focal point of the laser beam moves relative to the measuring means along the axis of relative motion thereof;

(b) providing a positioning means for moving the focal point of the laser beam along the axis of relative motion thereof and for supplying different coordinate positions corresponding to different physical positions of the focal point of the laser beam along the axis of relative motion;

(c) moving the focal point of the laser beam in a first direction along the axis of relative motion thereof relative to the measuring means to produce a first Gaussian distribution of the measurable property at the measuring means;

(d) measuring the first Gaussian distribution of the measurable property at the measuring means as a function of the coordinate positions of the focal point of the laser beam along the axis of relative motion;

(e) identifying a first particular coordinate position of the focal point of the laser beam along the axis of relative motion that corresponds to a peak value of first Gaussian distribution; and (f) repeating steps (c)–(e) for movement of the focal point of the laser beam along each axis of relative motion in a multi-dimensional coordinate system having a plurality of different axes of relative motion to thereby identify a first particular coordinate position for each of the plurality of axes of relative motion.

2. The method of claim 1, wherein the moving step comprises substantially continuously moving the focal point of the laser beam in the first direction along the axes of relative motion at a predetermined velocity.

3. The method of claim 2, wherein the measuring means exhibits a response time lag in the measurement of the measurable property by the measuring means as the focal point of the laser beam is moved along the axis of relative motion at its predetermined velocity, and further including the step of correcting the first particular coordinate position for the response time lag to derive a true coordinate position for the peak value of the first Gaussian distribution.

4. The method of claim 3, wherein the correcting step comprises the following:

(a) moving the focal point of the laser beam relative to the measuring means along the axes of relative motion in a second direction which is opposed to the first direction at the same predetermined velocity of motion as in the first direction to produce a second Gaussian distribution of the measurable property at the measuring means;

(b) measuring the second Gaussian distribution of the measurable property at the measuring means as a function of the coordinate positions of the focal point of the laser beam along the axes of relative motion;

(c) identifying a second particular coordinate position of the focal point of the laser beam along the axes of relative motion that corresponds to a peak value of the second Gaussian distribution; and (d) averaging the first and second particular coordinate positions to derive the true coordinate position.

5. The method of claim 1, wherein the positioning means spatially moves a worktable relative to a spatially fixed focal point of the laser beam to move the focal point of the laser beam along the axes of relative motion.

6. The method of claim 1, further including the step of pre-positioning the focal point of the laser beam at the first particular coordinate position(s) identified for any axes of relative motion for which steps (c)–(e) have been performed before repeating steps (c)–(e) for movement of the focal point of the laser beam along other axes of relative motion for which steps (c)–(e) have not yet been performed.

7. The method of claim 1, wherein the plurality of axes of relative motion comprise three orthogonal axes of relative motion defining an xyz coordinate system.

8. The method of claim 7, further including the step of pre-positioning the focal point of the laser beam at the first particular coordinate position identified for the first axis of relative motion before repeating steps (c)–(e) for movement of the focal point of the laser beam along the second axis of relative motion, and of pre-positioning the focal point of the laser beam at the first particular coordinate positions identified for the first and second axes of relative motion before repeating steps (c)–(e) for movement of the focal point of the laser beam along the third axis of relative motion.

9. The method of claim 1, further including the steps of:
(a) repeating steps (c)–(e) in various iterations thereof over a period of time with the measuring means being placed at a single unchanging reference location relative to the axes of relative motion for each iteration;
(b) storing the first particular coordinate position identified in a first iteration of steps (c)–(e) as a reference value of position along the axes of relative motion; and
(c) comparing the first particular coordinate positions identified in iterations subsequent to the first iteration to the stored reference value of position to detect any position variance therebetween, whereby any detected position variance indicates that a relative shift has occurred along the axes of relative motion between the focal point of the laser beam and the positioning means for the focal point of the laser beam between the time of the first iteration and the time of any subsequent iteration in which a position variance is detected.

10. The method of claim 9, further including the steps of:
(a) establishing a tolerance band for an acceptable position variance; and
(b) determining if any detected position variances exceed the tolerance band.

11. The method of claim 1, wherein the measurable property comprises laser beam power level and the measuring means comprises a power measuring device for measuring the power level of the laser beam.

12. The method of claim 11, further including the steps of:
(a) providing a pinhole aperture spaced from the power measuring device; and
(b) passing the laser beam through the pinhole aperture to allow the laser beam to diverge after passing through the pinhole aperture before the laser beam strikes one face of the power measuring device.

13. The method of claim 12, further including the step of spacing the power measuring device from the pinhole aperture by a distance which is sufficient such that the beam has an energy density when it strikes the power measuring device which is below a threshold at which the power measuring device would be damaged.

14. The method of claim 13, wherein the one face of the power measuring device has a predetermined area, and further including the step of spacing the power measuring device from the pinhole aperture by a distance which is sufficient such the beam covers an area when it strikes the power measuring device which is approximately equal to the predetermined area of the one face of the power measuring device.

15. The method of claim 1, wherein the positioning means spatially moves the focal point of the laser beam relative to a spatially fixed worktable to move the focal point of the laser beam along the axes of relative motion.

16. A laser beam measurement system for identifying a three dimensional reference location for the focal point of a focused laser beam in a three dimensional xyz coordinate system, which comprises:
(a) a beam measurement device comprising:
(i) a pinhole aperture located at a fixed point in the xyz coordinate system; and
(ii) means for measuring a measurable property of the laser beam after it passes through the pinhole aperture such that the measurable property of the beam at the measuring means will exhibit a Gaussian distribution as the focal point of the laser beam moves relative to the pinhole aperture along the x, y and z axes of the coordinate system;
(b) a positioning means for moving the focal point of the laser beam relative to the pinhole aperture in each of the three x, y and z axes of the xyz coordinate system and for supplying different x, y and z coordinate positions corresponding to different physical positions of the focal point of the laser beam along the x, y and z axes, respectively; and
(c) logic and control means for:
(i) measuring the particular Gaussian distribution of the measurable property that occurs when the focal point of the laser beam moves relative to the pinhole aperture along each axis in the coordinate system; and
(ii) identifying the coordinate position of the laser beam along each axis corresponding to a peak value of the Gaussian distribution measured for that axis to derive a three dimensional reference location corresponding to the point in the xyz coordinate system as read from the positioning means at which the focal point of the laser beam is centered on the pinhole aperture.

17. A method of determining the location of a focal point of a focused laser beam in a three dimensional xyz coordinate system, which comprises:
(a) providing a pinhole aperture at a fixed position in the xyz coordinate system;
(b) providing a means for measuring a measurable property of the laser beam which measuring means is arranged relative to the pinhole aperture with the laser beam passing through the pinhole aperture to reach the measuring means such that the measurable property of the beam at the measuring means will exhibit a Gaussian distribution as the focal point of the laser beam moves relative to the pinhole aperture along the x, y and z axes of the coordinate system;
(c) providing a positioning means for moving the focal point of the laser beam relative to and along the x, y and z axes of the coordinate system and for supplying different x, y and z coordinate positions corresponding to different physical positions of the focal point of the laser beam relative to and along the x, y and z axes, respectively; and
(d) performing the following sub-steps for each of the x, y and z axes of the coordinate system with relative motion of the focal point of the laser beam along the x and y axes being parallel to a plane containing the pinhole aperture such that the focal point of the laser beam scans longitudinally and transversely across the pinhole aperture and relative motion of the focal point of the laser beam along the z axis being perpendicular to the plane containing the pinhole aperture such that the focal point of the laser beam scans radially towards or away from the pinhole aperture:

(i) moving the focal point of the laser beam in a first direction along the axis of relative motion relative to the pinhole aperture to produce a first Gaussian distribution of the measurable property at the measuring means;

(ii) measuring the first Gaussian distribution of the measurable property at the measuring means as a function of the coordinate positions of the focal point of the laser beam along the axis of relative motion; and (iii) identifying a first particular coordinate position of the focal point of the laser beam along the axis of relative motion that corresponds to a peak value of the first Gaussian distribution, whereby, following completion of sub-steps (i)–(iii) along each of the x, y and z axes of the coordinate system, a first particular x coordinate position, a first particular y coordinate position, and a first particular z coordinate position will have been identified comprising a three-dimensional reference location corresponding to the location of the focal point of the laser beam when the focal point is centered on the pinhole aperture.

18. The method of claim 17, wherein the measurable property comprises laser beam power level and the measuring means comprises a power measuring device for measuring the power level of the laser beam.

19. The method of claim 17, wherein step (d) is performed in various iterations over time with the three dimensional reference locations identified in iterations subsequent to a first iteration being compared to a three dimensional reference location identified in the first iteration to detect any variance therebetween.

20. A method of determining the location of a focal point of a focused laser beam along an axis of relative motion of the beam, which comprises:

(a) providing a means for measuring a measurable property of the laser beam which measuring means is so constructed and arranged relative to the laser beam such that the measurable property of the beam at the measuring means will exhibit a Gaussian distribution as the focal point of the laser beam moves relative to the measuring means along the axis of relative motion thereof;

(b) providing a positioning means for moving the focal point of the laser beam along the axis of relative motion thereof and for supplying different coordinate positions corresponding to different physical positions of the focal point of the laser beam along the axis of relative motion;

(c) moving the focal point of the laser beam in a first direction along the axis of relative motion thereof relative to the measuring means to produce a first Gaussian distribution of the measurable property at the measuring means;

(d) measuring the first Gaussian distribution of the measurable property at the measuring means as a function of the coordinate positions of the focal point of the laser beam along the axis of relative motion;

(e) identifying a first particular coordinate position of the focal point of the laser beam along the axis of relative motion that corresponds to a peak value of the first Gaussian distribution;

(f) repeating steps (c)–(e) in various iterations thereof over a period of time with the measuring means being placed at a single unchanging reference location relative to the axis of relative motion for each iteration;

(g) storing the first particular coordinate position identified in a first iteration of steps (c)–(e) as a reference value of position along the axis of relative motion; and (h) comparing the first particular coordinate positions identified in iterations subsequent to the first iteration to the stored reference value of position to detect any position variance therebetween, whereby any detected position variance indicates that a relative shift has occurred along the axis of relative motion between the focal point of the laser beam and the positioning means for the focal point of the laser beam between the time of the first iteration and the time of any subsequent iteration in which a position variance is detected.

21. A method of determining the location of a focal point of a focused laser beam along an axis of relative motion of the beam, which comprises:

(a) providing a means for measuring a measurable property of the laser beam which measuring means is so constructed and arranged relative to the laser beam such that the measurable property of the beam at the measuring means will exhibit a Gaussian distribution as the focal point of the laser beam moves relative to the measuring means along the axis of relative motion thereof;

(b) providing a pinhole aperture located relative to the measuring means such that the laser beam passes through the pinhole aperture to contact the measuring means;

(c) providing a positioning means for moving the focal point of the laser beam along the axis of relative motion thereof and for supplying different coordinate positions corresponding to different physical positions of the focal point of the laser beam along the axis of relative motion:

(d) moving the focal point of the laser beam in a first direction along the axis of relative motion thereof relative to the pinhole aperture such that the laser beam passes through the pinhole aperture to contact the measuring means to produce a first Gaussian distribution of the measurable property at the measuring means;

(e) measuring the first Gaussian distribution of the measurable property at the measuring means as a function of the coordinate positions of the focal point of the laser beam along the axis of relative motion; and (f) identifying a first particular coordinate position of the focal point of the laser beam along the axis of relative motion that corresponds to a peak value of the first Gaussian distribution.

22. A laser beam measurement system for identifying a reference location for the focal point of a focused laser beam in a coordinate system having at least one axis, which comprises:

(a) a beam measurement device comprising:
(i) a pinhole aperture located at a fixed point in the coordinate system; and
(ii) means for measuring a measurable property of the laser beam after it passes through the pinhole aperture such that the measurable property of the beam at the measuring means will exhibit a Gaussian distribution as the focal point of the laser beam moves relative to the pinhole aperture along each axis of the coordinate system;

(b) a positioning means for moving the focal point of the laser beam relative to the pinhole aperture in each axis of the coordinate system and for supplying different coordinate positions corresponding to different physical positions of the focal point of the laser beam along each axis, respectively; and (c) logic and control means for:
  (i) measuring the particular Gaussian distribution of the measurable property that occurs when the focal point of the laser beam moves relative to the pinhole aperture along each axis in the coordinate system; and (ii) identifying the coordinate position of the laser beam along each axis corresponding to a peak value of the Gaussian distribution measured for that axis to derive a reference location corresponding to the point in the coordinate system as read from the positioning means at which the focal point of the laser beam is centered on the pinhole aperture.

23. The system of claim 22, wherein the coordinate system is a multi-dimensional coordinate system having a plurality of axes.

* * * * *